(12) United States Patent
Saadat

(10) Patent No.: US 8,453,692 B2
(45) Date of Patent: Jun. 4, 2013

(54) VEHICLE RIM COMPRISING A CENTRAL VALVE

(75) Inventor: Fereshteh Saadat, Soest (DE)

(73) Assignee: M. Mohsen Saadat, Soest (DE)

( * ) Notice: Subject to any disclaimer, the term of this patent is extended or adjusted under 35 U.S.C. 154(b) by 335 days.

(21) Appl. No.: 12/522,170

(22) PCT Filed: Jan. 23, 2008

(86) PCT No.: PCT/DE2008/000117
§ 371 (c)(1),
(2), (4) Date: Jul. 3, 2009

(87) PCT Pub. No.: WO2008/095461
PCT Pub. Date: Aug. 14, 2008

(65) Prior Publication Data
US 2010/0038004 A1 Feb. 18, 2010

(30) Foreign Application Priority Data

Feb. 6, 2007 (DE) .......................... 10 2007 005 764
Nov. 30, 2007 (DE) .......................... 10 2007 058 036

(51) Int. Cl.
*B60C 29/02* (2006.01)
(52) U.S. Cl.
USPC .......................................... 152/427; 152/415
(58) Field of Classification Search
USPC ......... 152/415, 416, 417, 418, 427; 301/5.24, 301/105.1; 137/223
See application file for complete search history.

(56) References Cited

U.S. PATENT DOCUMENTS

| | | | | |
|---|---|---|---|---|
| 1,478,852 A | * | 12/1923 | Gauntt | 152/66 |
| 2,900,007 A | | 8/1959 | Hoogendoorn | |
| 3,937,077 A | * | 2/1976 | Klamm | 73/146.8 |
| 5,221,381 A | * | 6/1993 | Hurrell, II | 152/416 |

(Continued)

FOREIGN PATENT DOCUMENTS

| DE | 4130644 A1 | 4/1992 |
|---|---|---|
| DE | 19961020 A1 | 6/2000 |

(Continued)

OTHER PUBLICATIONS

Machine Translation of JP2005153769A.*

(Continued)

*Primary Examiner* — Kip T Kotter
(74) *Attorney, Agent, or Firm* — McNeely, Hare & War LLP; James E. Mrose

(57) ABSTRACT

The invention relates to a vehicle wheel, preferably a light alloy wheel, in which the compressed-air non-return valve is positioned axially in a valve unit (3a) in the center of the wheel hub (1), the pressure medium, air or other gases, being supplied either manually from the exterior via the valve (2a) or automatically from the vehicle side via the valve (2b) of the axial bore (9a). The pressure medium reaches the wheel base (35) and the tires via radial channels (9b) or pipes (9g) inside the wheel or the spokes. The axial and central valve (2a) allows the position of the valve to remain accessible irrespective of the position of the wheel, both for the manual filling of the tire from the exterior and for connection to the fully automatic tire pressure control system of the vehicle on the vehicle side. During operation, no shear forces or torques, which put a strain on wrist and elbow joints, are produced.

26 Claims, 9 Drawing Sheets

U.S. PATENT DOCUMENTS

| | | | |
|---|---|---|---|
| 5,313,996 A | 5/1994 | Bragg | |
| 5,443,582 A * | 8/1995 | Ching | 301/37.376 |
| 5,641,208 A * | 6/1997 | Stach | 301/64.102 |
| 2005/0205182 A1* | 9/2005 | Maquaire et al. | 152/417 |

FOREIGN PATENT DOCUMENTS

| | | | |
|---|---|---|---|
| EP | 0503296 A | | 9/1992 |
| EP | 0698507 A | | 2/1996 |
| EP | 1216848 A | | 6/2002 |
| JP | 2005082056 A | * | 3/2005 |
| JP | 2005153651 A | * | 6/2005 |
| JP | 2005153769 A | * | 6/2005 |
| JP | 2005199785 A | * | 7/2005 |
| JP | 2006044562 A | * | 2/2006 |
| WO | 01/17802 A | | 3/2001 |

OTHER PUBLICATIONS

Machine Translation of JP 2006044562A.*

* cited by examiner

VEHICLE RIM COMPRISING A CENTRAL VALVE

CROSS-REFERENCE TO RELATED APPLICATION

This application is a U.S. national phase application under 35 U.S.C. §371 based upon co-pending International Application No. PCT/DE2008/000117 filed on Jan. 23, 2008. Additionally, this U.S. national phase application claims the benefit of priority of co-pending International Application No PCT/DE2008/000117 filed on Jan. 23, 2008, German Application No. 10 2007 005 764.6 filed on Feb. 6, 2007 and German Application No. 10 2007 058 036.5 filed on Nov. 30, 2007. The international application was published on Aug. 14, 2008 under Publication No. WO 2008/095461.

BACKGROUND OF THE INVENTION

1. Field of the Invention

The invention relates to a vehicle wheel, preferably a light metal wheel, in which the commercially available pressure medium feed and non-return valve closable by spring force is accommodated preferably axially on the axis of rotation of the wheel, the pressure medium, being air or other gases, being fed to the valve from the vehicle axle and drive shaft either manually from the outside or automatically by the vehicle itself.

2. Description of the Prior Art

As a rule, the valves of vehicle wheels are positioned on the wheel circumference. When controlling and filling or discharging the tire, the valve sometimes is conveniently accessible above, but with the aperture downwardly directed, i.e. upside down and on other occasions sideways and sometimes down below near the bottom and deeply in the gap of the hub cap or between the spokes and poorly accessible. As a result, when applying the compressed air gun a transverse force and a bending moment arises at the neck of the valve fixture on the wheel edge and its reaction forces and moments cause straining of the wrist and arm joints. In addition to that, the valve, when the wheel rotates, gives rise to a quite appreciable unbalance. In addition, it is readily accessible and can be manipulated by unauthorized persons. Dirt and abrasion dust collects around it and it cannot be cleaned easily.

U.S. Pat. No. 2,900,007 discloses a steel wheel (24), the valve unit (56, 60) of which is screwed to the center of the wheel opposite to the wheel axle to a sleeve (38, 40) and secured by means of a nut (58). The sleeve (38, 40) in turn is screwed onto a steel strap (30) and a sheet metal cladding (62) and locked by a lock nut (46) and secured to the bracket (36). The sleeve (38, 40) has a nipple (48) which is connected by way of a hose-like ducting (50) to the tire interior and covered by the cover sheet (62).

The disadvantage of this principle resides in the relatively large number and from a manufacturing point of view not quite uncomplicated components involved in this solution of the object and in the unbalance, which is caused by the mass of the hose during rotation. Moreover, the hose covered by the hub cap is readily accessible once the hub cap is removed and can be damaged very easily either by accident or intentionally. The existing unbalance is further aggravated by the additional components and by the radial hose, since the prior art valve on the wheel circumference is still present.

SUMMARY OF THE INVENTION

In contrast to the aforegoing it is the object of the invention to facilitate by means of a valve provided centrally and axially close to the hub of the wheel the accessibility of the valve virtually devoid of any unbalance and independently of the position or orientation of the wheel, operating the valve more simply and reliably either manually or automatically without generating a bending moment and in addition to that, provide the vehicle itself with the capacity to itself regulate the tire pressures and adapt these to the prevailing road and climatic conditions as well as weather conditions by means of on-board provided components such as e.g. a compressor, computer and electromagnetic valves.

Due to the valve being axially accommodated within the center of the wheel hub, the position of the valve, regardless of the position of the wheel, remains readily accessible both from the outside for manual and automatic attending, as well as from the vehicle side for automatic interaction by the vehicle itself. When operating and actuating the valve, no transverse forces and no bending moments arise, neither at the neck of the valve nor at the hand or arm joints of the operator.

In a most simple embodiment a wheel according to the invention in its central hub comprises a valve unit in which a commercially available non-return valve, preferably closable by spring force, is axially placed with its compressed air connection directed outwardly or towards the wheel axle and contacts the pressure medium through a radial passage or through a plurality of passages of the wheel into the tire. The central valve unit is preferably pre-manufactured to have stellar radial ductings which conduct the pressure medium from the valve unit towards the bed of the wheel and is inserted as a complete unit during casting or injecting molding of the wheel into the casting mold and embedded in the injected material. In order to prevent the central valve unit, including its radial ductings suffering deformation during casting of the light metal wheel and also, in the course thereof, slag formation or surface corrosion, it is preferably manufactured of a stainless ferritic steel or a titanium or nickel alloy. The central valve unit or the ductings may also be made of glass fiber-reinforced, heat-resistant plastics or ceramic materials or of flexible tubular chain links.

A further advantageous embodiment of the invention provides for a valve unit which is axially insertable or screwable into the central wheel hub, with or without a cover and which accommodates the commercially available valve in a receiving bore which, as a rule, is centrally situated and may serve from the outside for the accommodation of the wheel or vehicle manufacturer emblem and/or a tire pressure indication and the cover is optionally lockable. For purposes of manual charging of the tire, the cover is opened by traction, pressure, bending or torsion or by means of a key. The use of such a separate valve unit permits substantially greater freedom of design in respect of the number, configuration and positioning of the spokes of the wheel and in respect of the outlet of the pressure medium feed passages into the wheel hub and into the central valve unit.

A further development of the valve unit placed into the wheel hub makes provision for the installation of a tire pressure measuring system in the wheel hub adjoining or coaxially embracing the central valve. Preferably, the tire pressure measuring and indicating system as well as the valve are first jointly integrated into the valve unit and thereafter inserted as a complete unit into the wheel hub. In this context, the cover of the valve unit preferably serves as an indicator instrument for the tire pressure. It can be easily opened and be turned as an articulated display towards the eye and is preferably lockable by annular resilient members on its inside or by way of an annular groove around the valve.

Because the pressure measuring system is close to the valve and air passages are there provided, which are connected to the tire interior, the tire pressure may be indicated by known measuring systems such as, e.g., Piezo-effect, expansion measuring strips, simple spring or rubber membranes or similar known elements and physical effects, purely mechanically without external energy, electro-mechanically or purely electronically or by ultrasound or electromagnetic waves be conducted to the on-board computer of the vehicle. The direct display on the wheel is preferably accommodated in the double-walled cover or behind the cover of the valve unit, the former during the manufacture of the latter of plastics being either molded onto the latter in the form of a flexible film linkage or separately manufactured and fitted to the valve unit by known principles such as cylinder or ball and socket jointing. The cover of the wheel hub is preferably manufactured from a transparent material such as glass, polyacrylic or macrolon and serves as a viewing window for analogue or digital indications or display regarding the pressure prevailing in the tire interior. The configuration of the display within the double-walled cover may be radial, column-shaped or circular and coaxial surfaces which change their color as a function of pressure. It is also possible for texts to appear in the display which describe the condition of the tire and the tire pressure and give indications regarding safety such as, e.g. the date of fitting of the tire.

The pressure medium passes either from outside or from the vehicle side through the valve fitted axially in the central valve unit and from there radially directly or by way of a replaceable valve unit placed in sealing relationship in the wheel hub by way of radial passages or hosepipes or ductings of the wheel and the wheel spokes to the wheel bed and into the tire.

A thus designed wheel may be employed both for simple manual operation of the compressed air control as well as for a fully automatic tire pressure regulating system by way of the vehicle itself as well as for a fully automatic filling of the tire by the first installer. The wheel remains unchanged for both manners of application. However, the central valve unit is inserted into the wheel hub either from the one side or from the other side, or it is adapted from the start for both applications. The visible exterior of the wheel hub is closed off by a preferably lockable cover which may also cover the wheel bolts or nuts. In that manner no cap which needs to be screwed on is required for the actual valve. This means that the nipple around the valve may also be used as the pin for a compressed air coupling and simultaneously also for fixing the cover in place. When using an interchangeable central valve unit which is inserted into the wheel hub after the manufacture of the wheel hub, the valve needle for manual operation points outwardly, whilst for automatic operation by the vehicle itself it points towards the vehicle axle or the drive shaft.

For manual operation the central valve points with its needle head into the direction facing away from the vehicle. In this valve arrangement the free space around the valve is advantageously designed for fitting a key for fixing or releasing and interchanging the valve unit in relation to the wheel hub, annularly hollow and circumferentially hexagonal, polygonal, cycloid-shaped or in the manner of an internally stellar, crowned or Allan-type key-headed screw.

A further modification of the invention provides that for manual, semi to fully automatic operation by means of a compressed air hose or by means of a compressed air gun an annular circumferential groove, serving as a coupling member, nipple or socket for engagement with a mechanical or electromechanical coupling for compressed air feeding is provided on the cylindrical circumference of the valve nipple and/or on the outer mantle area of the annular cavity around the valve nipple with or without a key-fitting, the second coupling member, socket or nipple of the compressed air feeding means being provided on the compressed air hose or the compressed air gun. These circumferential grooves are preferably also used for arresting the valve cover.

For a fully automatic compressed air regulating system by the vehicle itself, there is provided on the end face side of the valve nipple directed towards the wheel axle or the drive shaft, coaxially around the valve, an axial groove or, on the cylindrical circumference of the valve nipple a circumferential groove, in which a dynamic axial or radial seal matching the wheel axle or a static axial or radial seal matching the drive shaft is accommodated. In this arrangement the wheel axle or the drive and universal shaft represents the second coupling member of the compressed air feed unit which may also as an alternative to the valve unit be provided with the groove and the sealing means of the coupling unit.

A thus designed valve, centrally and axially placed in the wheel hub and including a coupling element integrated therewith permits the filling and controlling of the tire pressure both manually as well as automatically and also by the vehicle itself.

The compressed air gun or compressed air hose may be fitted manually by means of such a coupling element, socket or nipple onto the coupling element of the valve in the wheel hub, nipple or socket or be inserted into these and be released therefrom. The coupling members integrated in the valve unit of the wheel and in the head of the compressed air gun will automatically firmly maintain the compressed air connection to the wheel until the tire pressure set at the compressed air gun or at the wheel valve has been attained. As soon as the set tire pressure has been attained, the coupling is released automatically and thus uncouples the compressed air connection to the wheel valve. No additional source of energy is needed, because compressed air itself contains energy and can perform work.

During filling of the tire a ring or pin coaxially placed around the valve in the central valve unit and being held axially movably by way of a resilient membrane or spring forces, performs an axial movement in relation to the valve unit. The position of this ring or pin is a measure for the tire pressure. During the filling of the tire this ring or pin projects ever more as the pressure increases and presses against the coupling socket, which during filling of the tire embraces the valve. It automatically releases the lock of the coupling socket on attainment of the required tire pressure. The releasing force of this ring or pin is predetermined by way of its projection area as a function of the tire pressure i.e. during the pairing and assembling of the tire on the wheel by the manufacturer and is preset e.g. by the rear side of the valve unit or the appropriate valve unit is installed from the start in the wheel hub.

In vehicles with an automatic tire pressure regulating system the centrally arranged valve and the coupling element, i.e. the groove for sealing, face in the direction of the vehicle. At the end of the fixed wheel axle of the non-driven wheels as well as at the end of the revolving drive or universal shaft of the driven wheels with or without steering, there is likewise provided a commercially available compressed air valve, fitted with a readjusting spring and coaxially embraced by a coupling element represented by a sealing surface or sealing groove matching the coupling element of the wheel hub. The valve of the wheel axle and the drive or universal shaft is supplied on the vehicle side with pressure medium through a central bore in the neutral zone on the axis of rotation of the axle and the shaft.

When the wheels are not fitted, all valves, those of the wheels and those of the wheel axles and drive and universal shafts are closed. Once the wheel according to the invention has been fitted, the valve needle of the wheel presses against the valve needle of the wheels axle and the drive or universal shaft. The valve springs mutually cancel their respective blocking actions and both valves are opened. As a result, the tire is connected, even during travel, to the automatic tire pressure regulating system of the vehicle. The static or dynamic revolving seals of the coaxial coupling around the two valves of the wheel hub and the drive shaft or the wheel axle, where the radius is smallest, take care that no air escapes from the system.

In the case of the system of non-driven wheels the sealing between the fixed wheel axle and the revolving wheel hub is performed by the use of an air-tight bearing. In that case, additional sealing is brought about between the wheel and the wheel hub by means of a static seal such as an O-ring on the wheel hub or, in the alternative, in the wheel hub.

In a more advantageous embodiment of sealing the non-driven wheels a dynamic axial sealing ring, which is U-shaped like a tire or of quad-ring configuration, fitted coaxially in relation to the two valves of the wheel and the fixed wheel axle into two mutually opposing axial grooves on the end face side, takes care that the pressure medium passes from the valve of the wheel axle into the valve of the valve unit in the center of the wheel hub, without escaping through the wheel hub. The of the wheel axle may likewise project in tubular fashion into the wheel or into the valve unit in the center of the wheel hub and be sealed against the aforegoing by way of a radial sealing ring or a shaft sealing ring. The smaller the diameter of this seal is designed the lower will be the circumferential velocity and the resultant abrasion as well as the frictional moment of the sealing lips which provide the sealing action. This system represents a dynamic coupling between the central valve unit in the wheel hub and the wheel axle and drive or universal shaft on the vehicle side. The dynamic seal is preferably accommodated loosely, i.e. floatingly, in its groove such that the abrasion is shared between the sealing lips on both sides. The life expectancy of the seal is doubled thereby. It may also be fitted one-sidedly in a groove and perform sealing by means of a single sealing lip axially against an end face of the valve unit or of the wheel axle.

In the case of the system of the driven wheels with or without steering, a self-locking and self-sealing wheel nut takes care that no pressure medium escapes between the drive shaft or universal shaft and the wheel hub. Between the wheel and the wheel hub sealing is brought about in that case by a static seal such as an O-ring on a shoulder of the wheel hub or alternatively on the wheel hub.

In a more advantageous solution to this sealing problem a shoulder of the drive or of the universal shaft projects into an annular rebate of the wheel or of the central valve unit of the wheel and there provides sealing with the aid of a static seal radially and, in relation to the wheel valve, coaxially. The dynamic seal between the drive or universal shaft and the vehicle is provided in that case at the vehicle-side end of the drive or universal shaft, i.e. on the side of the homokinetic joint which is encapsulated by a pleated bellows. Between the central valve unit in the wheel hub and the drive or universal shaft the static sealing may likewise be brought about axially on the end face side.

BRIEF DESCRIPTION OF THE DRAWINGS

In detail there is shown in.

Identical components are denoted by the same reference number or the same letters. Different indices denote different regions or different embodiments or multiple provisions of the same element.

DESCRIPTION OF THE PREFERRED EMBODIMENT

Figure 1:
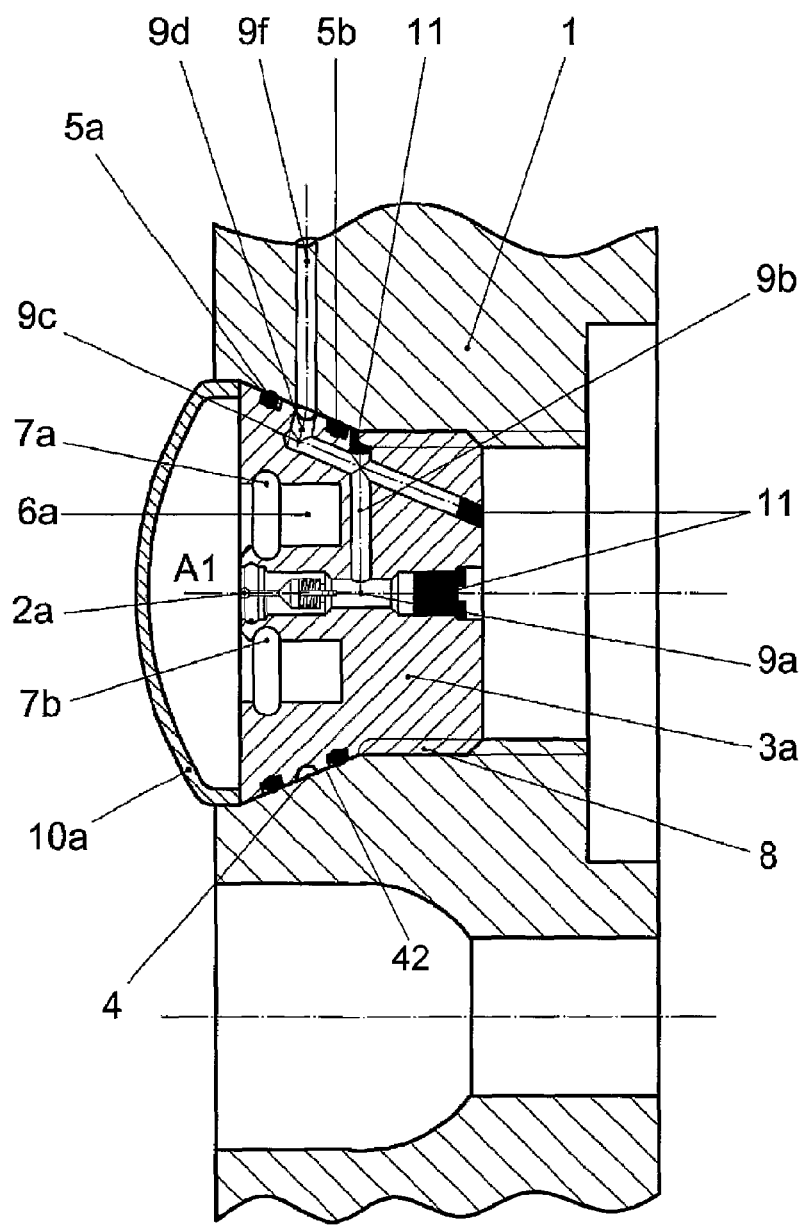
FIG. 1 the cross-sectional view through the wheel hub in accordance with the invention, comprising a central valve unit inserted from the outside for manually filling the tire, in the center of which the wheel valve has been placed axially and a coupling element has been placed coaxially around the valve.

According to FIG. 1, on the axis of rotation (A1) in the hub (1) of a wheel a valve (2a) is fitted centrally and interchangeably, with its head facing away from the vehicle side to a central valve unit (3a). The valve unit (3a) comprises on its circumference a groove (4) for feeding and discharging compressed air into and from the wheel and carries on both sides of the groove (4) two further sealing grooves (5a, 5b), in each of which a static seal, such as, e.g. an O-ring is accommodated. The wheel valve (2a), which is preferably commercially available, is connected by longitudinal and transverse bores (9a, 9b, 9c, 9d) of the valve unit (3a) to the circumferential groove (4), which alternatively may also be provided in the wheel hub.

The valve unit (3a) comprises in its center around the valve (2a) a key socket (6a) which may take the form a hexagonal socket, a crowned socket or an Allan key socket or the like and comprises in its circumference a groove (7a), serving as a coupling socket for coupling thereto a compressed air coupling, for example in the conventional manner by means of balls and springs. As an alternative the outside of the valve (2a) may be designed as a coupling nipple (7b) of a compressed air coupling. Such couplings for compressed air connections form part of the state of the art and need therefore not be further explained. The valve unit (3a) is inserted from outside or from the vehicle side into the wheel hub (1) and secured by fastening elements such as, e.g., a self-locking fine thread (8) and a cone or shoulder serving as an abutment.

Within the wheel in at least one spoke of the wheel, a radial bore (9f) is accommodated which during casting or injection-molding of a light metal wheel is first inserted into the mold in the form of a tube. In order to ensure that this tube, which has a higher melting point than that of the alloy of the light metal wheel, will not create an unbalance during rotation of the wheel, its inner and outer diameters are so dimensioned that its bulk weight by volume will be the same as that of the light metal alloy of the wheel. The medium, air or other gases, with which the tire is filled, enters by way of the valve (2a) through the bores (9a, 9b, 9c, 9d) and the circumferential groove (4) of the valve unit (3a) into the bore or bores (9f) of the wheel or respectively the wheel spokes and from there into the tire, which is not illustrated. In order to avoid unbalances in any case and to reduce the filling duration of the tire and depending on the number of spokes of the wheel, pipe ducts (9f) are accommodated in a plurality of the spokes, depending on the number of spokes of the wheel, all of these being supplied by way of the same circumferential groove (4) on the periphery of the wheel hub or on the periphery of the valve unit, preferably in a conical region thereof with compressed air. Inside the valve unit likewise a plurality of radial passages (9b, 9c, 9d) exists, which conduct the pressure medium from the valve (2a) to the circumferential groove (4). The air feed and discharge may alternatively, as in steel wheels, proceed outside of the spoke of the wheel by way of a hose or rigid tube. Both the wheel valve (2a) as well as the valve unit (3a) are each separately interchangeable.

The cover (10a) covers the valve unit (3a) and preferably carries the logo of the manufacturer. It may be inserted as a separate component into the wheel hub (1). However, it may also be injection-molded integrally by way of a film linkage together with the valve unit (3a) of plastics and be openable by pulling, pressing or turning or with a key.

The stoppers (11) seal the bore apertures of the compressed air passages (9a, 9b, 9c) which are present for manufacturing reasons.

It stands to reason that the wheel valve can be fixed axially directly into a bore of the wheel hub. However, this would not provide the numerous advantages of a valve unit (3a).

Figure 2:
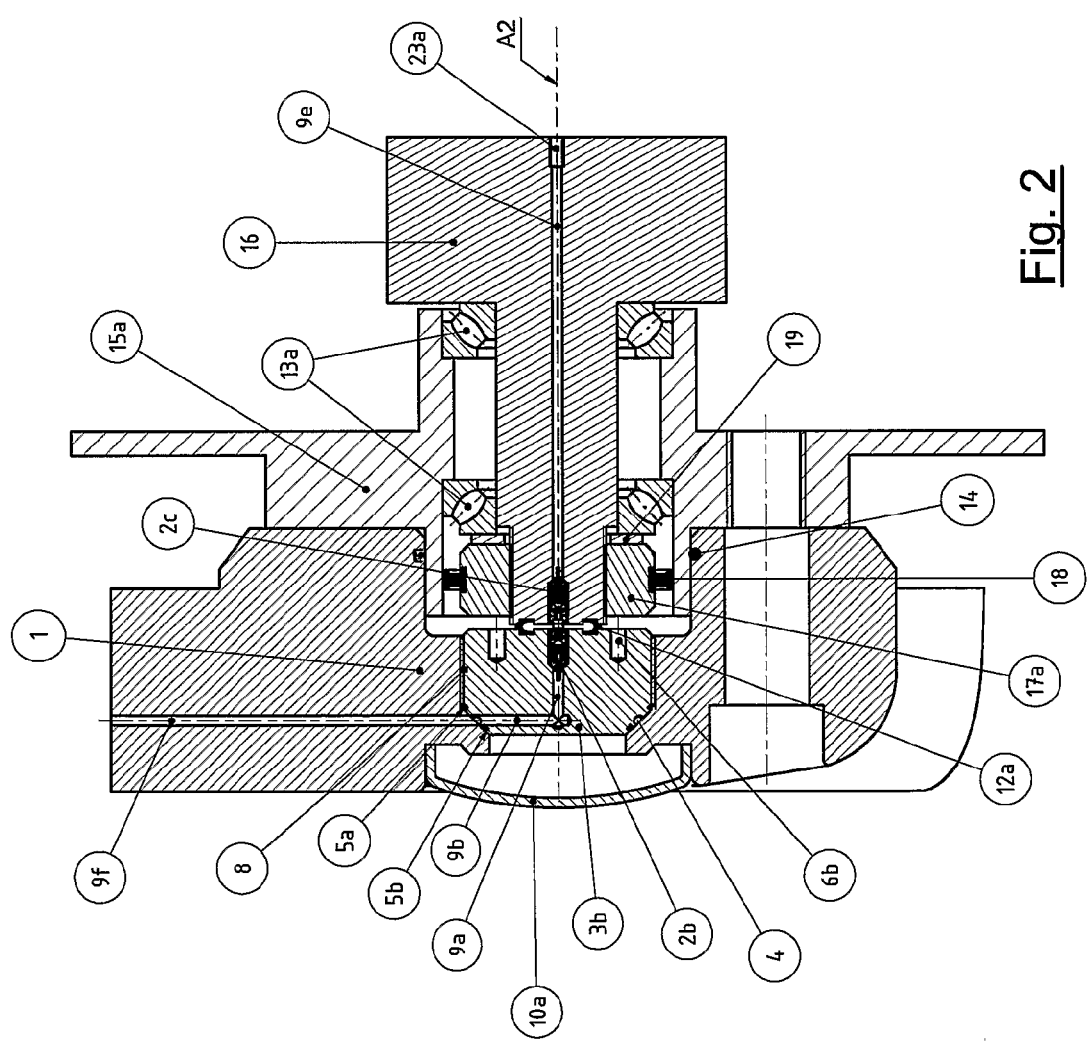
FIG. 2 the cross-sectional view through the wheel hub according to the invention, comprising a centrally arrange valve unit facing the vehicle, for automatically filling the tire through the fixed axle of a non-driven wheel. Coaxially about both valves a dynamic axial seal is provided, serving as a coupling between the two components which revolve in relation to one another.

According to FIG. 2 a wheel according to the invention has been bolted onto the wheel hub (15a) of a non-driven wheel suspension or wheel axle (16). The wheel hub (15a) is mounted on the wheel axle (16) by way of roller bearings (13a) and is secured with the aid of the self-locking nut (17a).

A valve unit (3b) including the wheel valve (2b) facing in the direction of the vehicle is provided in the outermost part of the wheel hub (1).

The valve unit (3b) with its circumferential groove (4) and seals (5a, 5b) is fixed in sealing relationship by means of the key socket (6b) and a self-locking fine thread (8) on the wheel hub, preferably by way of a conical rebate in the wheel hub. The valve unit (3b) may, as illustrated in FIG. 1, be fitted into the wheel hub from the outside. However, as illustrated here, it is preferably fitted into the wheel hub from the vehicle side. The latter permits an equalizing of forces on the valve unit (3b), brought about by the pressure medium on the valve side on the one hand and on the conical circumferential groove (4) on the other hand, which can be optimally preset by appropriate dimensioning of the projection areas.

The axis (A2) of the wheel axle or the vehicle suspension (16) has a bore passing therethrough in its neutral zone. The pressure medium, air or other gases, passes from the vehicle through resilient hoses by way of the connection (23a) and through the central bore (9e) of the wheel axle (16) to the axle valve (2c) which is fitted interchangeably to the end of the wheel axle (16). From there the pressure medium proceeds by way of the wheel valve (2b), bores (9a, 9b) as well as the circumferential groove (4) of the central valve unit (3b) into the wheel bore (9f) and from there into the tire, which is not illustrated.

If the wheels are not fitted, the wheel valve (2b) in the valve unit (3b) seals off the pressure medium in the tire-wheel system. On the vehicle side the axle valve (2c) seals off the pressure medium of the vehicle system, so that from neither system the pressure medium can escape. After the fitting of the wheel hub (1) including the central valve unit (3b) to the wheel hub (15a), the needle head of the wheel valve (2b) presses against the needle head of the axle valve (2c), so that both valves are opened. This causes connection of the tire air to the automatic tire pressure regulating system of the vehicle.

An airtight sealed roller bearing (13a) or a self-locking and self-sealing wheel nut (17a) including a dynamic radial sealing ring (18) integrated onto its circumference takes care that the pressure medium between the wheel axle (16) and the wheel hub (15a) will not escape. The air gap between the wheel hub (15a) and the wheel hub (1) is sealed by a static seal, such as, for example, by an O-ring (14) in the wheel hub (1) or on the wheel hub (15a).

A more advantageous solution of this sealing problem provides on each of the mutually opposing end face sides of the wheel axle (16) and of the central valve unit (3b) an axial groove coaxially in relation to the axis of rotation (A2) serving as a coupling element, in which a U-shaped dynamic seal (12a) is placed, preferably in floating manner, the aperture of which is directed towards the pressure medium, i.e. the axis of rotation (A2). With such sealing of the two mutually revolving components (3b, 16) the other sealing means of the wheel hub (1) in relation to the wheel hub (15a) and the wheel hub (15a) in relation to the wheel axle (16) are dispensed with. Moreover, this dynamic seal (12a) which accordingly is subject to abrasion can be exchanged or replaced whenever wheels are changed, i.e. at least twice a year.

If a wheel so designed, comprising a wheel according to the invention, is disconnected from the vehicle, both non-return valves (2b, 2c) on the valve unit (3b) of the wheel hub and on the wheel axle (16) become closed immediately and both systems remain sealed. Preferably, the needle heads of both co-acting valves (2b, 2c) are of such configuration that they lend each other mutual lateral support. This may, for example, be brought about by a ball and socket-like configuration of the co-acting valve needle heads, convexly and concavely respectively, or they respectively form two acute inner and outer cones of hardened material in order to suffer little friction and very low wear.

Figure 3:
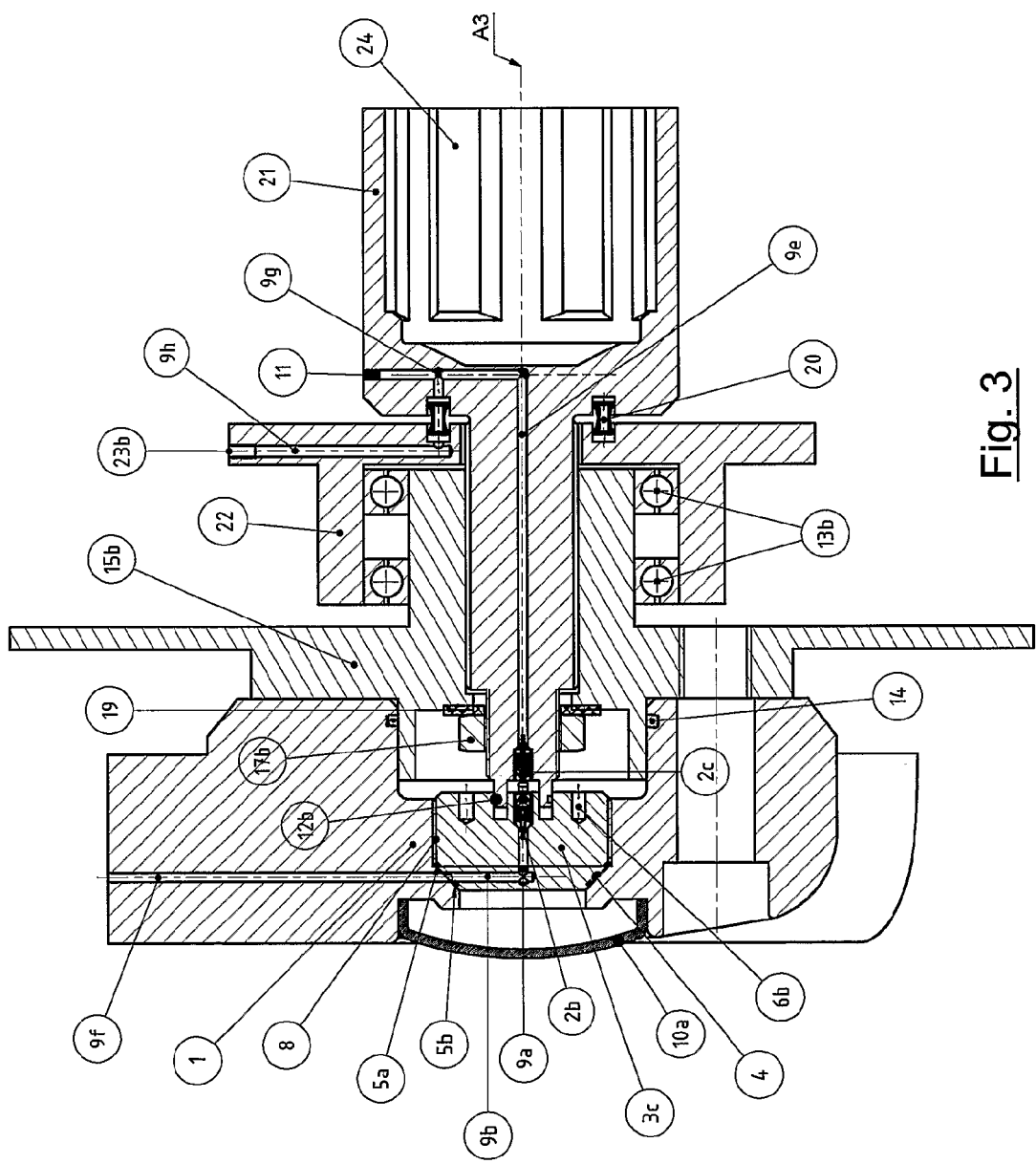
FIG. 3 the cross-sectional view through the hub of the wheel according to the invention, comprising centrally arranged and facing away from the vehicle a valve unit for the automatic filling of the tire through the revolving drive or universal shaft of a driven and steered wheel. Coaxially around the valve a coupling including a static seal is provided.

According to FIG. 3 a wheel according to the invention is fitted onto the wheel hub (15b) of a driven driving shaft (21) or a steered and driven universal shaft (24). The central valve unit (3c) including the wheel valve (2b) directed towards the vehicle is accommodated in the foremost part of the wheel hub (1).

The valve unit (3b) including the circumferential groove (4) and the seals (5a, 5b) is fixed by means of a key socket (6b) and a self-locking fine thread (8) to the wheel hub in sealing relationship, preferably by way of a rebate or a shoulder in the wheel hub (1).

The axis of rotation (A3) of the drive or universal shaft (21, 24) carries an axial bore (9e) therethrough in its neutral zone. The pressure medium passes on the vehicle side through resilient hoses by way of the connection (23b) on the fixed or articulated wheel suspension and bearing housing (22) onto which as well the not illustrated brake caliper is fitted, through the bore (9h) in the wheel suspension (22) to the dynamic axial seal (20). From there the pressure medium proceeds through the axial groove on the end face side and bores (9g, 9e) of the drive or universal shaft (21, 24) to the commercially available axle valve (2c) which is fitted interchangeably to the drive or universal shaft (21, 24). From there the pressure medium passes by way of the wheel valve (2b) through bores (9a, 9b) as well as circumferential groove (4) of the valve unit (3b) into the wheel bore (9f) and from there into the tire, which is not illustrated. The stopper (11) closes the open bore (9g) which exists for manufacturing reasons.

The wheel is bolted onto the wheel hub (15b). The drive or universal joint (21, 24) sits in the wheel hub (15b), to which also the brake disk is fitted. The drive or universal shaft (21, 24), by way of a tooth system, transfers the torque positively onto the wheel hub (15b), which in its turn is rotatably mounted by way of roller bearings (13b) in the wheel suspension (22). A sealing washer (19) behind the wheel nut (17b) or the wheel nut (17b) as such, including a static seal integrated therewith take care that the pressure medium will not escape through the splined shaft connection between the drive or universal shaft (21, 24) and the wheel hub (15b). The air gap between the wheel hub (15b) and the wheel is sealed by a static seal such as, for example, an O-ring (14) in the wheel hub (1) or on the wheel hub (15b).

In a more advantageous solution of this sealing problem, a shoulder of the drive or universal shaft (21, 24) projects annularly and coaxially into an annular rebate of the valve unit (3b) of the wheel and there, by means of a static seal (12b) serving as a static coupling provides radial or axial sealing. It stands to reason that the static sealing means (12b) can be fitted in a circumferential groove on the valve seat (2b) of the valve unit (3c) and the rebate matching therewith can be provided in the drive or universal shaft (21, 24).

The dynamic sealing (20) between the drive or universal shaft (21, 24) and the wheel suspension (22) is in this case provided between the wheel suspension (22) and the drive or universal shaft (21, 24) on the side of the homokinetic joint (24) encapsulated by a pleated bellows. This seal may be replaced by unscrewing the wheel nut (17b) without interfering with the wheel mounting.

Because of the interchangeability of the wheels between a driven and a non-driven wheel hub, it is advantageous for both described coupling variants, between the revolving valve unit (3b, 3c) and the fixed wheel axle (16), to be of uniform design, i.e. dynamically on the one side and statically on the other side between the revolving valve unit (3b, 3c) and the revolving drive or universal shaft (21, 24), that is to say either both axially in accordance with FIG. 2 or both radially in accordance with FIG. 3.

Figure 4:
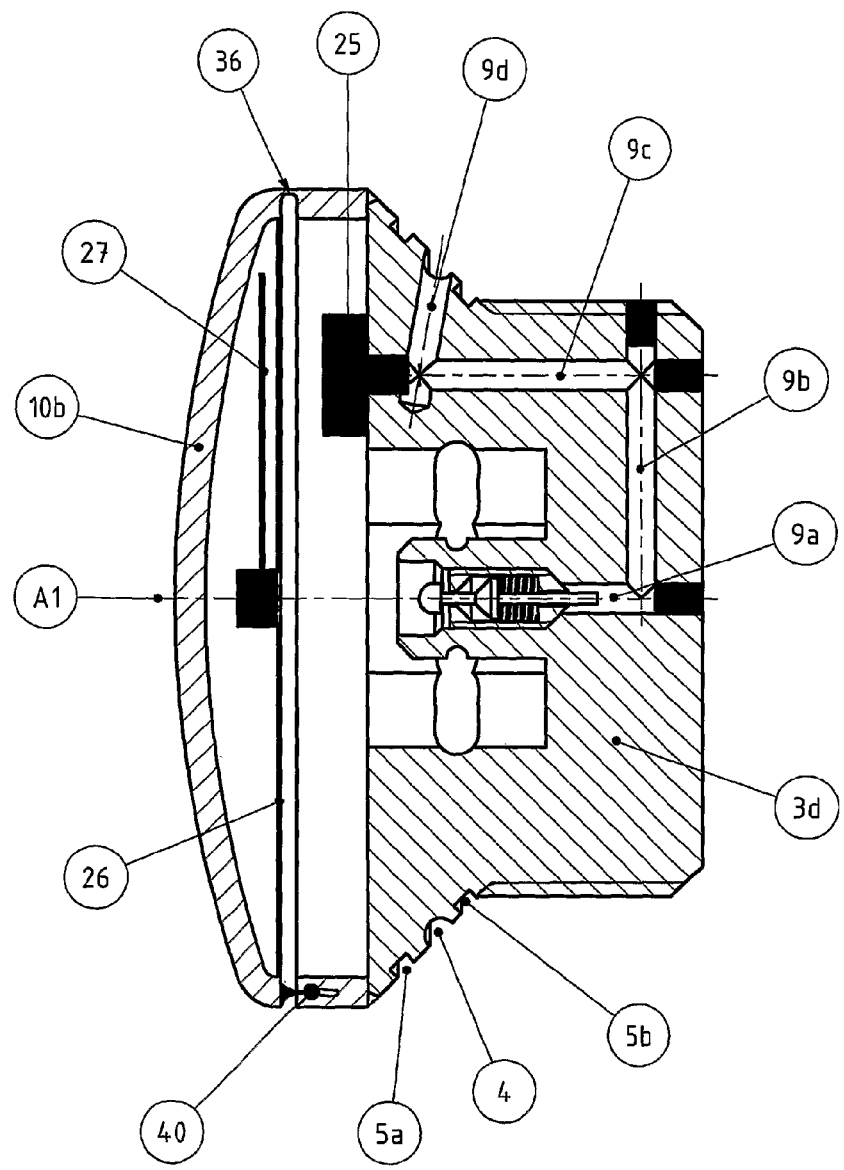
FIG. 4 the cross-sectional view through a central valve unit including a pressure sensor and a manometer in the cover of the valve unit.

According to FIG. 4 the central valve unit (3d) is equipped in its bore passages (9a, 9b, 9c, 9d) with a pressure sensor (25) which transmits the tire pressure either passively, i.e. mechanically, without extraneous energy, or electro-mechanically or electronically to the manometer (27) which is provided behind the transparent cover (10b). The sensor (25) may also transmit the tire pressure actively by means of weak electromagnetic waves, infrared, Bluetooth, ultrasound and the like by wireless transmission methods to the on-board computer of the vehicle or allow the latter to call up such reading. Behind the manometer (27) the required electronics and source of energy such as a battery cell are accommodated in the space (26). Alternatively, these may be accommodated in the central valve unit (3d). It is also possible for a chamber with colored liquids to be provided in the viewing window of the cover (10b) as a display, the color of which changes as a function of the tire pressure and accordingly represents a colored display of the existing tire pressure, which can easily be observed from outside without the need for bending over.

The cover (10b) is fixed to the valve unit (3d) by a film linkage (36). Its closing mechanism (40) likewise is part of the valve unit, so that they jointly form a unit and jointly can be injection-molded in a mold.

Figure 5:
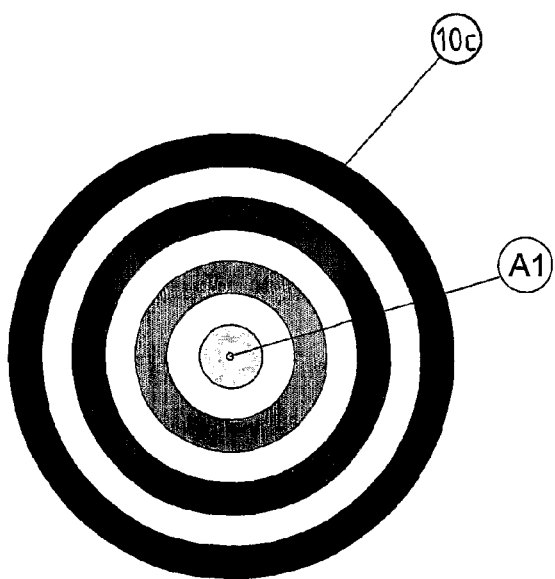
FIG. 5 the front elevation onto the cover of the valve unit, which is adapted as a display for indicating the tire pressure in the form of circles.

In accordance with FIG. 5 the cover (10c) of the central valve unit (3a, 3b, 3c, 3d) takes the form of a display on which the pressure condition is displayed in the form of colored circles or as circles having different thicknesses and shades of gray.

Figure 6:
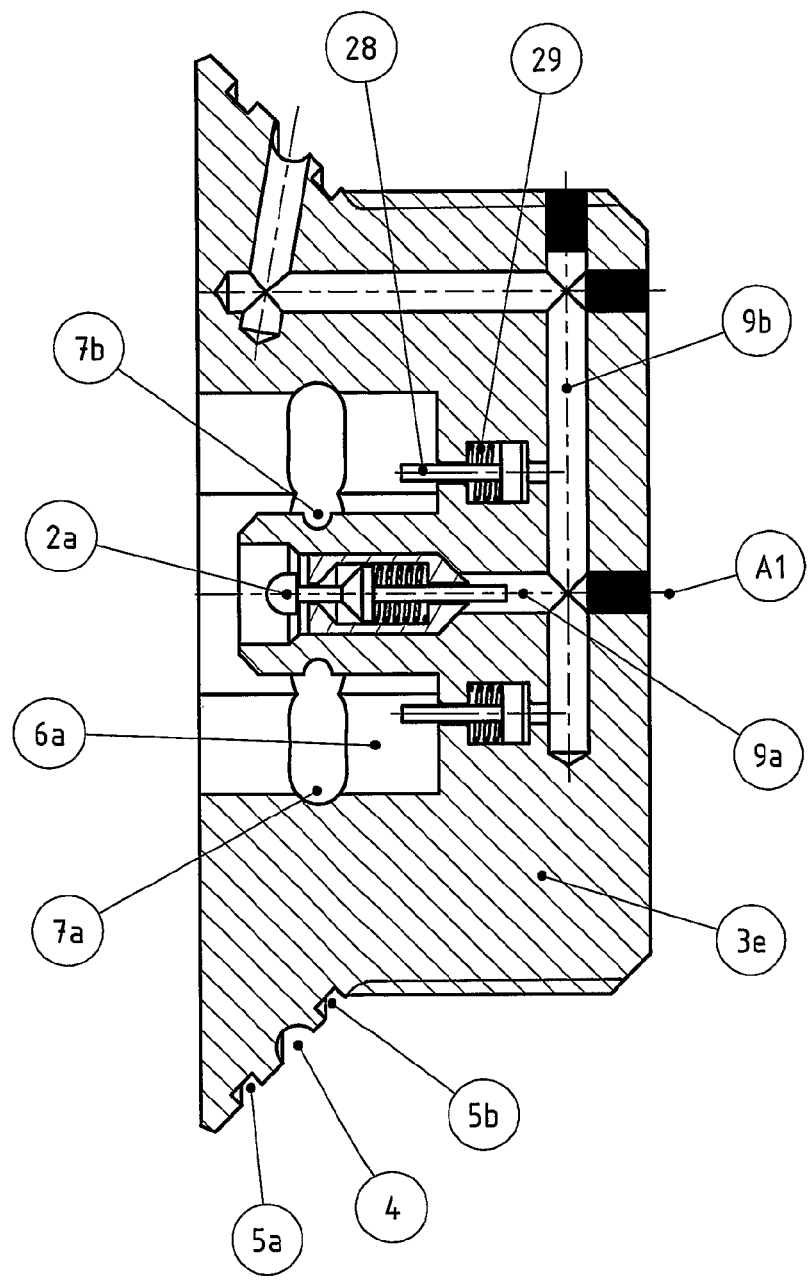
FIG. 6 the cross-sectional view through a valve unit, including a compressed air nipple and/or compressed air socket and an automatic release mechanism.

In accordance with FIG. 6 pins or a ring (28) provided parallel to the axis of rotation (A1) are accommodated in the annular cavity (6a) coaxially around the valve (2a), being on the one hand forced outwardly by the tire pressure in the passage (9b) and, on the other hand, being pressed back by the force of the spring (29). As the tire pressure increases, the ring (28) moves ever more outwardly against the spring force, so that the markings on the ring, respectively on the pins, act as a mechanical manometer. If a compressed air coupling socket is fitted over the coupling nipple around the valve (2a), the former snap-fits into the grooves (7a) or (7b) and fills the tire until the tire pressure has attained its predetermined level and the pins or the ring (28) cause the coupling socket, not illustrated, to be automatically uncoupled off the valve nipple.

Figure 7:
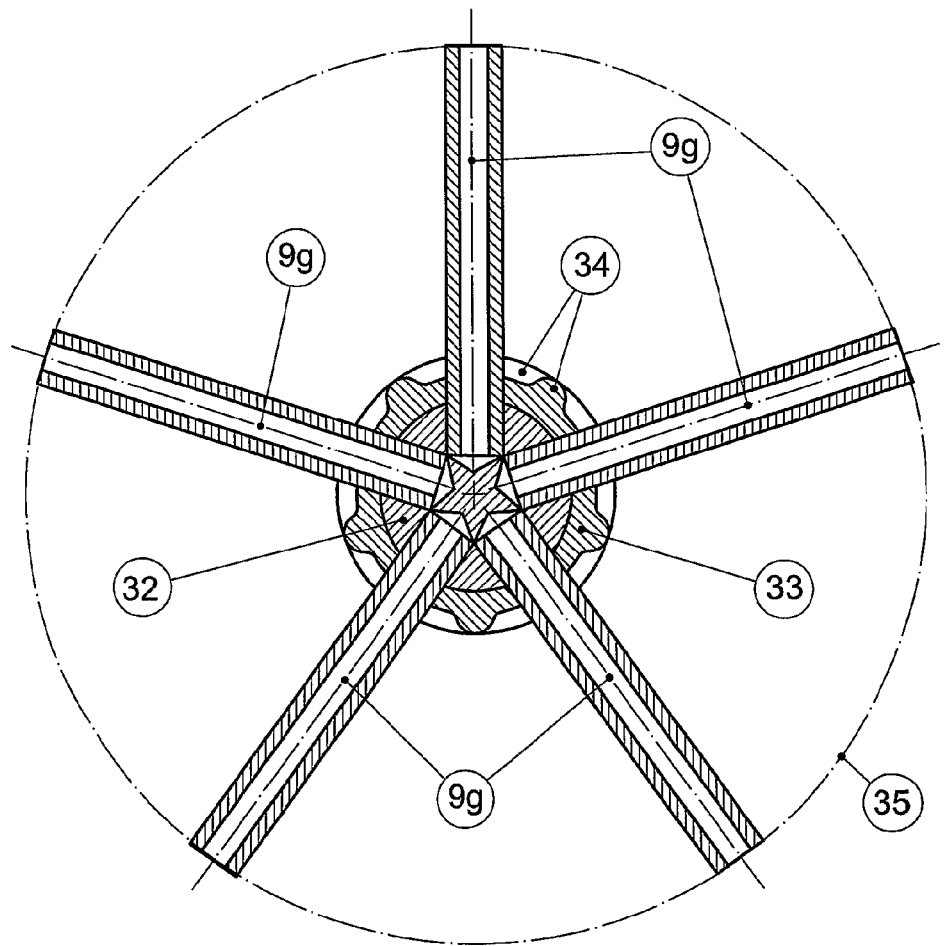
FIG. 7 a sectional view normal to the axis of rotation of a duct arrangement in five parts, such as is pre-manufactured for the production of five passages in the spokes of a wheel, comprising an insertable and interchangeable valve unit and which is to be inserted into the casting mold of the light metal wheel to be embedded by injection molding. An external ring holds the ducts in place and becomes embedded in the casting of the wheel hub. A cylindrical core punched out after casting having been completed causes shearing off the duct ends projecting beyond the outer ring.

In accordance with FIG. 7 at least one pipe duct (9g) is inserted into a radial bore of a ring (33), which jointly with the pipe duct (9g) is inserted into the casting mold of the light metal wheel. The ring (33) on the one hand positions the pipe duct or respectively all pipe ducts (9g) provided, namely five in the present case, in the casting mold and on the other hand it forms the pre-manufactured hub of the wheel for the accommodation of the central valve unit on the one hand and provides centering on the wheel hub on the other hand. The ring (33) can have its diameter increased to such an extent that it also accommodates the mounting bores or mounting bolts of the wheel. In that event, it is profiled (34) on its outer periphery for purposes of transmitting forces and torque. The connection between the pipe ducts (9g) and the ring (33) may likewise be utilized for purposes of power transmission. The pipe ducts (9g) may optionally be composed of a plastic having short-term heat resistance or may be assembled from moldable metallic or ceramic or similar flexible chain links.

A further more advantageous manufacturing method for the wheel hub with its radial air passages (9g) provides for a cylindrical repeatedly usable central member (32) of a hard material such as e.g. hardened tool steel, inside the ring (33), which on its circumference has as many radial bores as pipe ducts (9g) are present. This central member (32) is inserted first into the ring (33) so that the radial bores of the two components are mutually aligned. Thereafter the pipe ducts (9g) are inserted into the radial bores. In this context, the central member (32) by virtue of its defined bore depths serves as a radial abutment for the pipe ducts (9g). The pipe ducts (9g) are retained against slipping out and against turning around by an axial force acting onto the central member (32), e.g. by a spring, or by a tight fit. This unit, as illustrated in FIG. 7, is placed into the casting mold, preferably onto the lower negative mold half, which forms the visible side of the wheel. During the casting procedure the central member (32) prevents the molten material from entering the pipe ducts (9g). After withdrawing the cast wheel from the mold, the central member (32) is punched out. This causes shearing off all projecting ends of the pipe ducts (9g) and the removal thereof from the wheel hub. The ring (33) forms the final wheel hub, including its radial air passages (9g) extending up to the wheel bed (35). As a result, the wheel hub requires no subsequent mechanical or machined processing. When using such a pre-manufactured wheel hub which accommodates the bores of the wheel mounting as part thereof, all bores can be fully automatically covered off by a single cover during paint application to the wheel. A wheel cast together in such a manner from two parts allows any amount of design freedom in respect of color and design combinations and enriches the art of wheel manufacture. It is thus possible to place the wheel hub with the core of the spokes with or without visible surfaces into the casting mold and to embed them with light metals or plastics by injection-molding.

Figure 8:
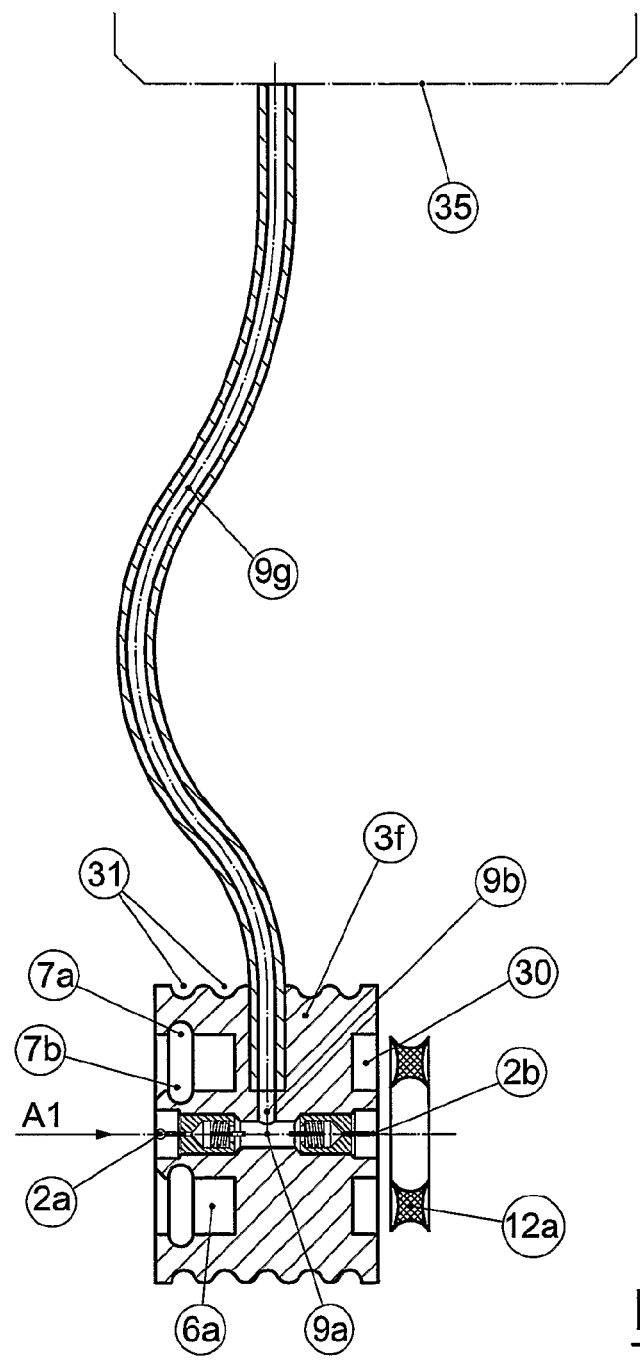
FIG. 8 the cross-sectional view through the axis of rotation of a central valve unit permanently cast into the wheel hub, including the air passage ducts firmly connected thereto for operational access from one side or both sides, manually or semi-automatically from outside or fully automatically by way of the vehicle itself through the wheel axle or through the drive or universal shaft.

In accordance with FIG. 8 at least one three-dimensionally molded pipe duct passage (9g) connects the wheel bed (35) radially to the central valve unit (3f). The ducts (9g) are pre-configured in accordance with the configuration of the spokes and fitted radially to the central valve unit (3f), preferably being inserted into the radial bores (9b) of the valve unit. The central valve unit (3f) is provided on its central axis (A1) with a bore, preferably a continuous bore (9a), which is connected to the radial bores (9b) and pipe duct passages (9g). On the outside of the wheel the axial bore (9a) of the valve unit (3f) a commercially available compressed air non-return valve (2a), closable under spring force, is screwed in. Surrounding this valve (2a) a nipple (7b) is provided which is designed as one half of a compressed air coupling. Surrounding the nipple a key socket (6a) and as an optional alternative to the nipple a coupling socket of a compressed air coupling (7a) is provided.

For vehicles with manual operation, the axial bore (9a) is either manufactured from the start as a blind hole or as a hole passing right through with valve connections on both sides, in which case the valve connection on the vehicle side is screwed closed by means of a blind stopper.

For vehicles with an automatic tire pressure regulating system the commercially available compressed air non-return valve (2b) is placed onto the end on the vehicle side of the axial bore (9a) of the valve unit (3f). In that case the axial bore (9a) may be manufactured in the direction of the outer side as a blind hole or the connection which is present may be closed by means of a blind stopper. It is also possible for both valves (2a, 2b) to be simultaneously present, as illustrated, in order to permit also a manual access to the system besides an automatic control by the vehicle itself.

Surrounding the valve (2b) an axial groove (30) into which a seal (12a) is placed, preferably in floating relationship, is provided on the end face side of the central valve unit (3f). The seal (12a) causes sealing of the valve unit dynamically in accordance with FIG. 2 against the non-driven wheel axle (16) and statically in accordance with FIG. 3 against the driven wheel shaft or drive shaft (21, 24), if the valve needle (2b) is opened by the valve needle (2c) of the vehicle axle or of the vehicle shaft.

The cylindrical outer circumferential surface of the central valve unit (3f) is preferably profiled so as to be connected positively to the wheel material. The valve unit (3f) pre-manufactured in that manner, including its radial pipe duct passages (9g) is placed into the casting mold as a complete unit, for purposes of manufacture of the wheel, in such a manner that its valve axis (A1) coincides with the axis of rotation of the wheel (A1). Shoulders in the valve unit (3a, 3b, 3c, 3d, 3e, 3f) and in the insert ring (33) take care of the centric mounting of the wheel during its subsequent mechanical processing and balancing.

Figure 9:
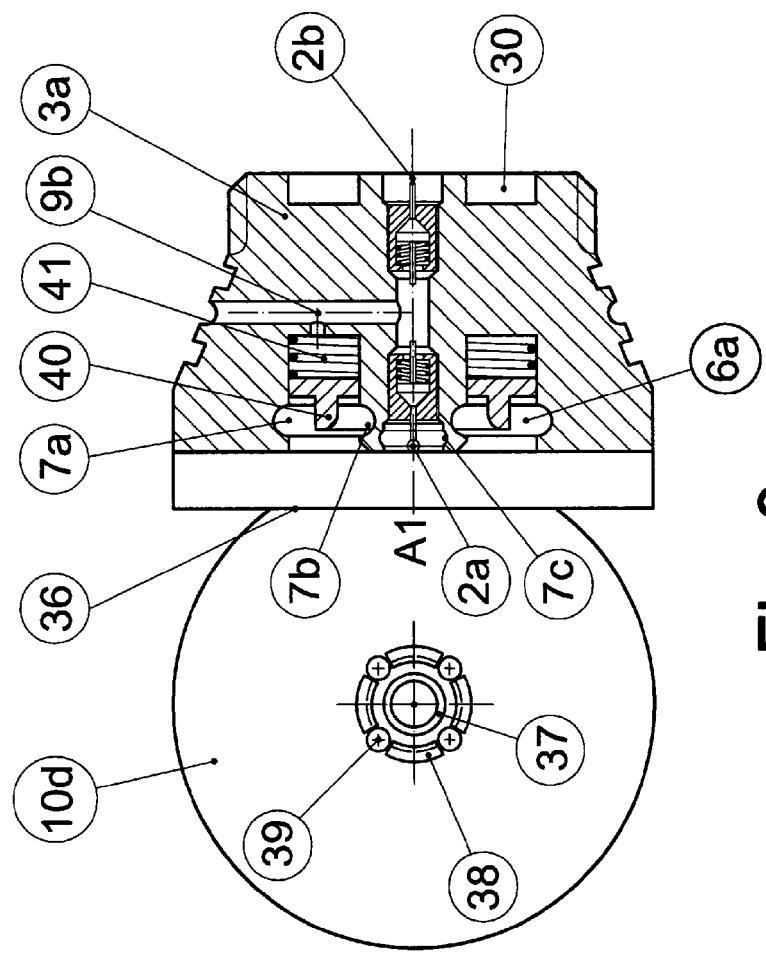
FIG. 9 the central valve unit which jointly with its cover has been manufactured integrally from plastics by virtue of a film linkage. On the rear side of the cover a slotted ring is provided opposite to the valve, which on closing the cover engages with spring-loading into the circumferential groove of the nipple around the valve and holds the cover closed.

In accordance with FIG. 9 the cover (10d) of the valve unit (3a) is injection-molded by way of a film linkage (36) integrally with the valve unit (3a) which is insertable into the wheel hub, or is separately manufactured and adapted to be inserted into the matching bead or rebate of the valve unit (3a) in a rotatable manner, preferably without additional fixing elements. The linkage (36) represents one side of the angular cover or one chord of a circular cover (10d). The inner side of the valve cover (10d) is equipped with round (37) or crown or barrel-shaped and preferably also radially slotted claw formations (38) which on closing the cover (10d) engage into the inside groove (7c) and/or outside groove (7b) of the valve nipple or into the inside groove of the rebate (6a) around the valve nipple (7a), thereby locking the cover (10d) positively or frictionally.

A locking ring (40), located in the coaxial cavity (6a) and axially movable around the valve (2a) and which by the force of the spring (41) or by the prevailing tire pressure in the passage (9b) is pressed outwardly, snaps over the slotted ring (38) of the lid after closing the cover (10d) and prevents involuntary opening of the cover (10d). At least one bore (39) in the cover (10d) opposite to the locking ring (40) permits opening of the cover by pushing aside the locking ring by means of a thin pin through one of the bores (39).

The features of the invention disclosed in the description, the drawings and the claims may both individually as well as in optional combinations be important for the practicing of the invention. All disclosed features are important to the invention.

The invention claimed is:

1. A vehicle wheel for a tire filled with compressed air or other gases, the vehicle wheel comprising:
   a wheel hub of the vehicle wheel;
   a central valve unit in a center of the wheel hub, the central valve unit having an axial bore and at least one radial bore; and
   at least one wheel valve insertable axially in the central valve unit in the center of the wheel hub of the vehicle wheel;
   the vehicle wheel having at least one radial bore or pipe duct;
   wherein the central valve unit is turnably inserted interchangeably in the center of the wheel hub, and a pressure medium, downstream of the wheel valve, enters from the axial bore of the central valve unit and passes via the at least one radial bore of the central valve unit into a circumferential groove between the central valve unit and the wheel hub and along the circumference of the central valve unit, and from there through the at least one radial bore in the vehicle wheel or the pipe duct in the vehicle wheel.

2. The vehicle wheel according to claim 1, further comprising a dynamic or a static seal placed in an annular, axial groove or a circumferential groove, the groove being arranged coaxially in relation to an axis of rotation of said wheel, the dynamic or static seal sealing off said wheel or said central valve unit against a fixed wheel axle or against a revolving drive or universal shaft.

3. The vehicle wheel according to claim 1, further comprising an annular cavity provided coaxially around said wheel valve, said cavity being configured as a key socket and with a groove, a socket, or a nipple for coupling to a compressed air coupling.

4. The vehicle wheel according to claim 3, wherein inside the annular cavity around the wheel valve is provided a mechanical component consisting of at least one of a ring and pins, the mechanical component having a projecting length which is a function of tire pressure and serves to release the compressed air coupling and to lock a valve cover.

5. The vehicle wheel according to claim 1, wherein within said wheel hub or within said central valve unit is provided an energy source and a pressure sensor measuring the tire pressure and indicating a measured value on site analogously or digitally by way of circular color differences or transmitting the said measured value by wire or in wireless fashion to other units.

6. The vehicle wheel according to claim 5, wherein the color differences are brought about by a passive piezo-element co-acting with the prevailing tire pressure.

7. The vehicle wheel according to claim 1, wherein said wheel valve or said central valve unit is covered by a cover which is opened and closed or, respectively, locked, said cover being fixed in an articulated manner to said central valve unit, manufacturing-wise forming an integral part of said central valve unit and being injection-molded by way of a film linkage, in a multipart injection mold integrally with said central valve unit.

8. The vehicle wheel according to claim 7, wherein said cover of said central valve unit comprises a display of a manometer, analogously or digitally or contains information in text form of the date of the tire fitting.

9. The vehicle wheel according to claim 7, wherein an interior of said cover comprises locking segments of circular or barrel-shaped beads or slotted claws, which during closing engage in said groove of said central valve unit and lock said cover.

10. The vehicle wheel according to claim 7, wherein the cover is fixed in an articulated manner to said central valve unit so as to be opened and closed, said cover defining an interior comprising locking segments of at least one of circular, barrel-shaped beads, and slotted claws, which during closing engage in a corresponding groove of said central valve unit and lock said cover.

11. The vehicle wheel according to claim 1, wherein the at least one pipe duct is made of a material selected from the group consisting of stainless ferritic steel, a titanium or nickel alloy, ceramic materials, and glass fiber-reinforced and heat-resistant plastics.

12. The vehicle wheel according to claim 1, wherein the vehicle wheel comprises multiple wheel spokes and the at least one radial bore in the vehicle wheel or the at least one pipe duct in the vehicle wheel is within at least one of the multiple wheel spokes.

13. The vehicle wheel according to claim 1, wherein the circumferential groove is a groove in the central valve unit.

14. A vehicle wheel for a tire filled with compressed air or other gases, the vehicle wheel comprising:
a wheel hub of the vehicle wheel;
a central valve unit in a center of the wheel hub, the central valve unit having an axial bore and at least one radial bore;
at least one wheel valve insertable axially in the central valve unit in the center of the wheel hub of the vehicle wheel; and
an annular cavity provided coaxially around said wheel valve, said cavity being configured as a key socket and with a groove, a socket, or a nipple for coupling to a compressed air coupling;
the vehicle wheel having at least one radial bore or pipe duct; and
wherein inside said annular cavity around said wheel valve is provided a mechanical component consisting of at least one of a ring and pins, said mechanical component having a projecting length which is a function of tire pressure and serves to release said compressed air coupling and to lock a valve cover.

15. A vehicle wheel for a tire filled with compressed air or other gases, the vehicle wheel comprising:
a wheel hub of the vehicle wheel;
a central valve unit in a center of the wheel hub, the central valve unit having an axial bore, at least one radial bore, and an annular cavity defined in the central valve unit; and
at least one wheel valve insertable axially in the central valve unit in the center of the wheel hub of the vehicle wheel;
the vehicle wheel having at least one radial bore or pipe duct;
wherein said wheel valve or said central valve unit is covered by a cover which is opened and closed or, respectively, locked, said cover being fixed in an articulated manner to said central valve unit, manufacturing-wise forming an integral part of said central valve unit and being injection-molded by way of a film linkage, in a multipart injection mold integrally with said central valve unit;
wherein an interior of said cover comprises locking segments of circular or barrel-shaped beads or slotted claws, which during closing engage in said groove of said central valve unit and lock said cover; and
further comprising an axially movable ring in said annular cavity around said wheel valve that is slid onto said locking segments of said cover by a spring force or by the prevailing tire pressure in said pipe duct of said vehicle wheel and secures said cover against unintentional opening.

16. A vehicle wheel for a tire filled with compressed air or other gases, the vehicle wheel comprising:
a wheel hub of the vehicle wheel;
a central valve unit in a center of the wheel hub, the central valve unit having an axial bore and at least one radial bore;
at least one wheel valve insertable axially in the central valve unit in the center of the wheel hub of the vehicle wheel;
the vehicle wheel having at least one radial bore or pipe duct;
wherein the central valve unit is turnably inserted interchangeably in the center of the wheel hub, and a pressure medium, downstream of the wheel valve, enters from the axial bore of the central valve unit and passes via the at least one radial bore of the central valve unit into a circumferential groove between the central valve unit and the wheel hub, and from there through the at least one radial bore in the vehicle wheel or the pipe duct in the vehicle wheel;
further comprising a spring force-loaded compressed air feed valve insertable axially in said central valve unit in the center of said wheel hub opposite said wheel valve, said spring force-loaded compressed air feed valve being in fluid communication with said at least one radial bore defined within said central valve unit.

17. A vehicle wheel comprising:
a wheel hub having at least one radial bore defined therein, said radial bore being in fluid communication with a tire;
a central valve unit insertable in a center of said wheel hub, said central valve unit comprising at least one longitudinal bore and at least one transverse bore each being defined in said central valve unit, said longitudinal and transverse bores being in fluid communication with each other; and an annular cavity defined in said central valve unit, said annular cavity being configured as a key socket with a groove defined in said annular cavity, said groove being used for coupling the central valve unit to a compressed air coupling; and
a wheel valve insertable axially in said central valve unit so that said annular cavity of said central valve unit is coaxially around said wheel valve, said wheel valve being in fluid communication with said longitudinal bore of said central valve unit.

18. The vehicle wheel according to claim 17, further comprising a pipe duct in the at least one radial bore of the wheel hub, the pipe duct being made of a material selected from the group consisting of stainless terrific steel, a titanium or nickel alloy, ceramic materials, and glass fiber-reinforced and heat-resistant plastics.

19. The vehicle wheel according to claim 17, wherein the central valve unit includes a conical region.

20. A vehicle wheel for a tire filled with compressed air or other gases, the vehicle wheel comprising:
a wheel hub of the vehicle wheel;
a central valve unit in a center of the wheel hub, the central valve unit having an axial bore and at least one radial bore; and
at least one wheel valve insertable axially in the central valve unit in the center of the wheel hub of the vehicle wheel;
the vehicle wheel having at least one radial bore or pipe duct;
wherein the central valve unit comprises an annular cavity defined in said central valve unit, the annular cavity being configured as a key socket with a groove defined in the annular cavity, the groove being used for coupling the central valve unit to a compressed air coupling, the vehicle wheel further comprising a wheel valve insertable axially in the central valve unit so that the annular cavity of the central valve unit is coaxially around the wheel valve, the wheel valve being in fluid communication with the axial bore of the central valve unit, wherein inside said annular cavity around said wheel valve is provided a mechanical component consisting of at least one of a ring, and pins, said mechanical component being parallel to the axis of rotation of said vehicle wheel, said mechanical component being accommodated in said annular cavity coaxially that is in fluid communication with said radial bore of said central valve unit, said mechanical component being forced outwardly by tire pressure in said axial and radial bores of said central valve unit and is pressed back by a force of a spring biasing said mechanical component, said mechanical component further comprises markings that act as a mechanical monomer as the tire pressure increases moving the ring outwardly against the spring force.

21. The vehicle wheel according to claim 20, wherein said mechanical component is configured to automatically uncouple said compressed air coupling from said groove of said annular cavity of said central valve unit when the tire pressure has attained a predetermined level.

22. A vehicle wheel assembly comprising:
a wheel hub having at least one radial bore defined therein, said radial bore being in fluid communication with a tire;
a central valve unit in a center of said wheel hub, said central valve unit comprising at least one radial bore or pipe duct passage defined in said central valve unit;
a first wheel valve insertable axially in said central valve unit along a central axis of the wheel hub, said first wheel valve being in fluid communication with said radial bore or pipe duct passage of said central valve unit; and
a second wheel valve insertable in said central valve unit positioned axially with and opposite of said first wheel valve, along the central axis of the wheel hub, said second wheel valve being in fluid communication with said radial bore or pipe duct passage of said central valve unit;
wherein the first wheel valve is positioned to allow a pressure medium, downstream of the first wheel valve, to enter through the radial bore or pipe duct passage defined in the central valve unit and from there through the radial bore of the wheel hub and into the tire;
wherein the second wheel valve is positioned to allow a pressure medium, downstream of the second wheel valve, to enter through the radial bore or pipe duct passage defined in the central valve unit and from there through the radial bore of the wheel hub and into the tire;
wherein the first and second wheel valves are each, independently of each other, in direct fluid communication with the radial bore or pipe duct passage defined in the central valve unit.

23. The vehicle wheel assembly according to claim 22, further comprising a pipe duct in the at least one pipe duct passage, the pipe duct being made of a material selected from the group consisting of stainless terrific steel, a titanium or nickel alloy, ceramic materials, and glass fiber-reinforced and heat-resistant plastics.

24. The vehicle wheel assembly according to claim 22, wherein the central valve unit includes a conical region.

25. A vehicle wheel for a tire filled with compressed air or other gases, the vehicle wheel comprising:
a central valve unit in a center of the vehicle wheel, the central valve unit having an axial bore and at least one radial bore defined therein; and
at least one wheel valve insertable axially in the central valve unit in the center of the vehicle wheel;
wherein the at least one radial bore of the central valve unit has at least one radially arranged, three-dimensionally formed pipe duct, with the central valve unit and the at least one pipe duct of the central valve unit being inserted into a casting mold with the at least one pipe duct plugged into or connected to the central valve unit, and being embedded in casting material;
wherein a pressure medium, downstream of the wheel valve, enters from the axial bore via the at least one radial bore of the central valve unit and from there through the at least one pipe duct;

further comprising an annular cavity provided coaxially around the wheel valve, the cavity being configured as a key socket and with a groove, a socket, or a nipple for coupling to a compressed air coupling.

26. The vehicle wheel according to claim 25, wherein the vehicle wheel comprises multiple wheel spokes and the at least one radial bore in the vehicle wheel or the at least one pipe duct in the vehicle wheel is within at least one of the multiple wheel spokes.

\* \* \* \* \*